Oct. 21, 1952     E. M. PARDUE ET AL     2,615,079
AUTOMATIC CONTROL FOR HEADLIGHTS OF MOTOR VEHICLES
Filed Jan. 3, 1951     2 SHEETS—SHEET 1

Inventors
Ralph Oron Higgins &
Elbert M. Pardue
By
Joshua R. H. Porte
Their Attorney Oct. 21, 1952 E. M. PARDUE ET AL 2,615,079
AUTOMATIC CONTROL FOR HEADLIGHTS OF MOTOR VEHICLES
Filed Jan. 3, 1951 2 SHEETS—SHEET 2

INVENTORS
RALPH HIGGINS
BY ELBERT M. PARDUE

THEIR ATTORNEYS

Patented Oct. 21, 1952

2,615,079

UNITED STATES PATENT OFFICE 2,615,079

AUTOMATIC CONTROL FOR HEADLIGHTS OF MOTOR VEHICLES

Elbert Matthew Pardue, Wilkesboro, N. C., and Ralph Oron Higgins, Chase City, Va.

Application January 3, 1951, Serial No. 204,224

4 Claims. (Cl. 175—321)

The present invention has to do with the headlights of a motor vehicle and is concerned primarily with the provision of a control which will automatically deflect the beam coming from the headlights upon the approach of an oncoming vehicle and then restore the beam to its elevated condition after that vehicle has passed.

At the present time the conventional automobile includes headlights which are designed to throw either a high beam or a low beam. While the high beam is the more desirable from the viewpoint of the driver of the car, it constitutes a menace to the driver in an approaching vehicle. Hence, just about every modern automobile is provided with a foot switch which may be operated by the driver to deflect the headlight beam or raise it as occasion demands.

Such an arrangement has not proven to be entirely satisfactory because in many instances the driver will not bother to operate the switch; his attention may be directed to other matters; he may not be aware of the fact that the beam is elevated; or he simply disregards the rights of the oncoming driver.

This highly unsatisfactory condition has long been recognized by automotive engineers working on this problem and various attempts have been made to provide a control for the headlights which is automatic and which will respond to the lights of an approaching vehicle to deflect the beam and raise it after such vehicle has passed. The problem has been recognized and many have attempted to solve it. Certain controls have been provided as a result of these efforts, but the fact remains that as yet such controls have not come into any appreciable use.

The failure of the car manufacturers and the public to adopt the now available automatic headlight controls is believed to be directly attributable to certain shortcomings in the controls themselves. Such controls must consist essentially of electronic circuits including a photo-electric cell. These circuits are operated from the battery of the car. As the car is continued in service, the battery runs down and the circuits must be adjusted to compensate for this variable condition. One of the main objections to the now known controls of this type is the necessity of adjusting it from time to time.

From the very nature of the control device, it is responsive to light. This light should be only that coming from an approaching vehicle. However, there are, under practical conditions, road signs and other sources of light, either direct or reflected, which affect the control at the wrong time. An important defect in the now known automatic headlight controls is the failure to effectively screen off or eliminate such extraneous sources of light, leaving the control responsive only to the light coming from an approaching vehicle.

With the foregoing conditions in mind, the present invention has in view as its foremost objective the provision of an automatic headlight control of the character indicated, which is self-compensating for variations in the operating conditions of the car in which it is installed. Thus, once the control is installed in an automobile, it is unnecessary for the owner to make adjustments from time to time. The device itself compensates for such variations as changes in the battery and the like.

More in detail the invention has as an object the provision of an automatic headlight control of the character indicated which includes means for adjusting the control of the voltage of a particular car battery. Once this adjustment is made, such as at the time of installation, there is no need for any further adjustment on the part of the car owner.

Another highly important object of the invention is to provide, in an automatic headlight control of the type aforesaid, means for eliminating or rendering non-effective all light except that coming from the headlights of an approaching vehicle. This end is accomplished by two factors. In the first instance, the photocell unit, which is really an electron-multiplier phototube, is housed in a casing which is positioned beneath the left front headlight of the car. This casing is light tight except for an aperture at the front, and the tube is so positioned in the casing with respect to the aperture as to permit only light coming from within a certain angle to reach the tube. In the second instance, the circuit includes certain instrumentalities which function as a low pass filter through which only currents below a certain critical frequency may pass. Light coming from sources other than that of an approaching vehicle might affect the phototube to create currents of higher frequencies, but these cannot pass the low pass filter.

Particular objects and advantages of the invention are tied up with the provision of the electronic circuit which will do the job required of it. Other objects and advantages are associated with the provision of a casing for housing the phototube. All of these will in part become apparent and in part be hereinafter stated as the description of the invention proceeds.

The invention therefore comprises an automatic headlight control for a motor vehicle which includes an electronic circuit that is self-compensating for voltage variations, together with a casing which houses the phototube and which casing is constructed and designed to properly limit the light which reaches the phototube.

For a full and more complete understanding of the invention, reference may be had to the following description and accompanying drawings wherein.

General environment

Figure 1:
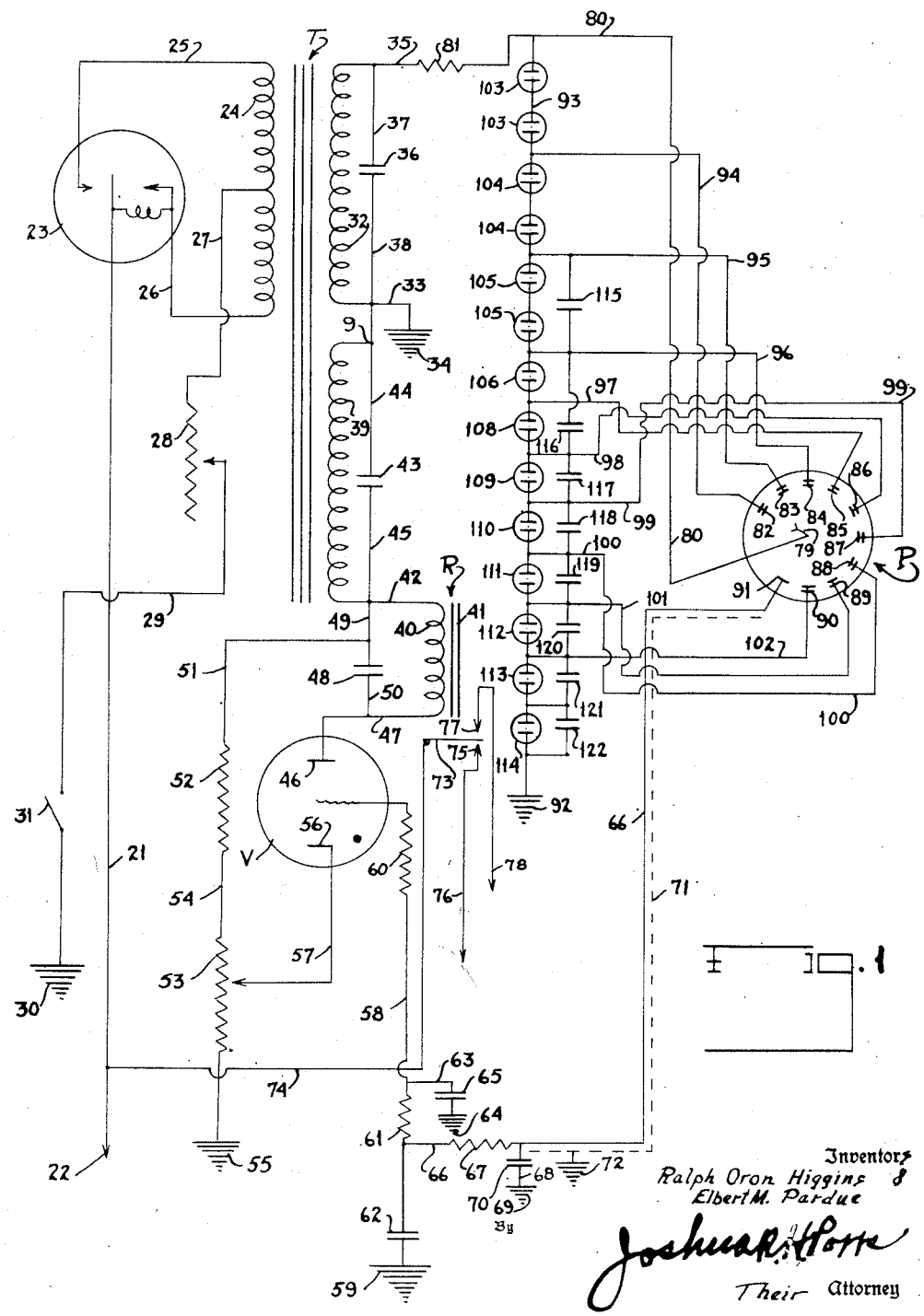
Figure 1 is a wiring diagram of the automatic headlight control of this invention.

From the very nature of the invention the automatic headlight control is intended to be installed in the present day conventional automobile. Such an automobile ordinarily includes a battery which constitutes a source of direct current. The automobile also includes a frame to which any circuit or electrical element may be grounded. Headlights are included and an electrical circuit therefor. Included in the circuit is a low beam light relay and a high beam light relay. These relays are ordinarily controlled by a manually operable switch including high and low beam contacts. This switch is commonly referred to as the dimmer switch. The automobile also includes the usual front fenders in which the headlights are mounted.

All of the structure and mechanism so far described is present in every conventional automobile. Hence, it is deemed unnecessary to illustrate such matter in the drawings any more than is necessary to bring in the relation with the elements of this invention.

Figure 2:
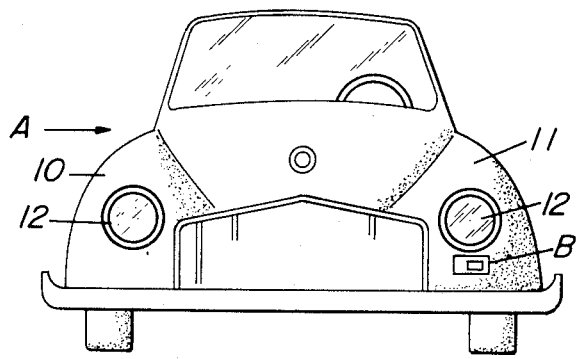
Figure 2 is a view in front elevation of a motor car, illustrating the position of the casing housing the phototube.

An automobile is depicted in Figure 2 and referred to in its entirety by the reference character A. It includes a right front fender 10 and a left front fender 11 which carry headlights 12. The automatic control of this invention is embraced in two units which are connected by a multi-wire cable. One of these units takes the form of a casing which houses the phototube and which casing is mounted in the left front fender 11 immediately beneath the headlight 12. The other unit is installed in the car in a convenient location and is preferably sealed tight after installation. The latter unit houses the various electrical and electronic devices making up the control.

As illustrated in Figure 2, a casing B is installed in the fender 11 beneath the headlight 12. The construction of this casing is shown in greater detail in Figure 3. A modified form of casing is shown as installed in the automobile in Figure 4 and is designated C. The casing C is illustrated in detail in Figure 5.

The phototube casing

Figure 3:
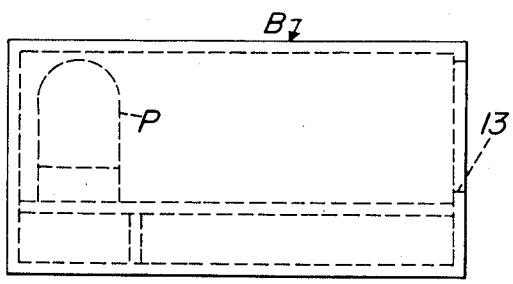
Figure 3 is a top plan view of the casing taken on an enlarged scale with certain parts shown with broken lines.

The simplest form of phototube casing is shown in Figures 2 and 3. As illustrated, the casing B is of a flat, rectangular formation and is completely enclosed except for an aperture 13 formed in the front or exposed wall. This aperture 13 is of rectangular formation, being about three times as long as it is high. Thus, by way of example, the aperture 13 may be one-half inch high and one and one-half inches long. These dimensions are not critical, although an essential requirement is that the aperture be longer than its height.

A phototube P is mounted in the rear of the casing B remote from the aperture 13. The spacing between the aperture 13 and the phototube P is of importance because this spacing determines the angle through which light will pass through the aperture and strike the phototube. Obviously the greater the spacing, the narrower the angle and vice versa. Purely by way of example it may be noted that with the opening 13 one and one-half inches by one inch, the phototube P is spaced six inches therefrom.

The casing B is installed in the car with the opening 13 having its longest dimension in a horizontal position. This provides a comparatively wide horizontal angle, but a narrow vertical angle. The object of this arrangement is to provide for only light from the headlights of an approaching vehicle passing through the opening onto the tube. The casing B is, of course, light tight and the only light which may enter thereinto is through the opening 13.

Figure 4:
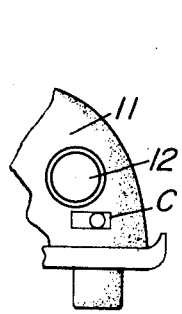
Figure 4 is a fragmentary view of the left front fender of the car with a modified form of casing applied thereto.
Figure 5:
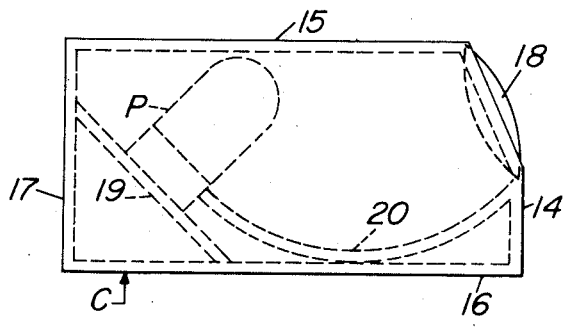
Figure 5 is a top plan view of the modified form of casing.

A more sensitive arrangement for mounting the photocell is illustrated in Figures 4 and 5. In this form the casing C has a front wall 14, an outer side wall 15, an inner side wall 16 and a rear end wall 17. The outer side wall 15 is somewhat shorter than the inner side wall 16 and the front wall 14 is provided with a circular opening in which is mounted a lens 18. This lens is positioned at an angle with respect to the sides of the casing which affords an outer facing of the lens 18. Extending between the rear wall 17 and the side wall 16 is a partition 19 which carries a phototube P which, it will be noted, is disposed at an angle with respect to the side wall. Mounted against the inner side wall 16 is a narrow strip reflector 20. The forward end of this strip is positioned at the front wall 14 substantially at the lens opening, while the rear end is at the phototube P.

The lens 18 has a focal length somewhat less than the space between the lens and the phototube P. When an oncoming car first comes into range, the light from its headlights passes through the lens 18 and is conveyed directly onto the phototube P. As the two cars come closer together, the light passing through the lens 18 will first strike the reflector 20 and be reflected by the latter onto the phototube, and this condition remains right up to the point where the two cars pass. Thus, there is always sufficient light coming from the headlights that is directed onto the phototube to hold the headlight beams deflected until the two cars pass, as will be later pointed out.

This lens and mirror arrangement is important from two aspects. When the light from the approaching headlights is farthest away, the entire area of the lens gathers the light and puts all the light so gathered onto the phototube. This means that the control is most sensitive when the lights are almost directly ahead. This sensitivity is sufficient to cause the control to operate and deflect the headlight beam being controlled. However, once this operation is accomplished there is no need for sensitivity to the same degree to hold the headlight beam deflected. As the two cars come closer together there is enough light gathered by the lens and reflected by the mirror 20 onto the phototube to prevent any change in the control. This permits the use of a relatively narrow reflecting strip which, of course, reduces the vertical angle from which light can reach the cell. This prevents lights from signs or other sources on the side of the road from affecting the control to the extent which they otherwise would. This modified form of the housing is highly directional and results in a positive operation of the control.

*The control circuit*

Referring now more particularly to Figure 1, the circuit of the control will be described. A line 21 has one end connected to the high beam contact of the manually operably high-low switch on the car, such connection being represented at 22. Through the connection 22 the line 21 is connected to the battery of the car.

The line 21 extends to a vibrator shown at 23. This vibrator serves to convert the direct current coming from the battery into alternating current.

A transformer is referred to in its entirety by the reference character T. It includes a primary 24, the opposite ends of which are connected by lines 25 and 26 to the vibrator 23. Another line 27 has one end connected to the primary 24 substantially midway thereof while its other end is connected to a variable resistor 28. From the variable resistor 28 a line 29 extends, and this line is grounded to the framework of the car as indicated at 30. Included in the line 29 is a manually operable switch 31 which preferably is a single pole, single throw switch of any type. The switch 31 is located in a position where it is accessible to the driver. When this switch 31 is opened the control circuit is disabled; when it is closed the control circuit is rendered effective. Thus, the driver may throw in or cut out the control as he wishes.

Included as a part of the power transformer T is a secondary 32. One end of the secondary 32 is grounded by a line 33 as indicated at 34. From the other end of the secondary 32 a line 35 is taken. This line 35 goes to the phototube P, as will be later described. A buffer condenser 36 is connected in parallel across the secondary 32 by a line 37 which extends on one side to the line 35, and another line 38 on the other side which extends to the line 33. The buffer condenser 36 serves to prevent voltage surges that might possibly damage the vibrator 23.

The power transformer T also includes another secondary 39 which operates the relay R and the thyratron tube to be later described.

In the power transformer T the primary 24 has four volts impressed thereacross. This creates a voltage of 1100 volts of alternating current in the secondary 32, and which voltage is used to excite the phototube P. A voltage of 110 volts is excited in the secondary 39 which is effective on the relay and thyratron control tube.

A relay indicated at R. It is a plate circuit relay of the single pole, double throw type. It includes a coil 40 and plates 41. One end of the secondary 39 is connected to one end of the relay coil 40 by a line 42. Another buffer condenser 43 is connected in parallel across the secondary 39 by lines 44 and 45. The line 44 has one end connected to the point of junction between lines 33 and 38, and one end of the secondary is connected to the line 44 between this junction and the condenser 43 as indicated at 9. The line 45 extends from the other side of the condenser 43 to line 42.

A thyratron control tube is shown at V. It includes an anode 46 which is connected by a line 47 to one end of the coil 40. A relay by-pass condenser is shown at 48. It is connected in parallel across the coil 40 by lines 49 and 50. This condenser 48 serves two purposes. It prevents chatter of the relay contacts and makes the relay slow opening. A line 51 has one end connected to the line 49 between the condenser 48 and the line 42 and its other end to a fixed resistor 52. The resistor 52 is a current limiting resistor which determines the voltage drop across the variable resistor 53 which is connected in series with the resistor 52 by a line 54. One end of the variable resistor is grounded as shown at 55. This resistor 53 determines the voltage at which the thyratron tube V will fire. That is, the resistor 53 is adjusted to determine the amount of light which is required by the phototube P before the control unit will operate. Once the resistor 53 has been adjusted no further adjustment is ordinarily made. That is, the adjustment is not an operating adjustment.

The thyratron tube V includes a cathode 56 which is connected by a line 57 with the variable resistor 53. A line 58 extends from the grid of the thyratron tube V to the grounded connection indicated at 59. Included in this line are two fixed resistors 60 and 61, and a condenser 62. Between the resistors 60 and 61 a line 63 is connected to the line 58, and this line is grounded as indicated at 64. Included in this line 63 is a condenser 65.

Connected to the line 58 between the resistor 61 and the condenser 62 is a line 66 which goes to the phototube P. Included in this line 66 is a resistor 67, and between the resistor 67 and the phototube P there is a line 68 which is grounded as indicated at 69, and which includes a condenser 70. The condensers 65, 62, and 70, together with the resistors 61 and 67, function as a low pass filter which prevents a fluctuating light from affecting the thyratron tube. Due to the fact that only currents below a certain critical frequency can pass this low pass filter, only light of practically steady intensity can cause the thyratron tube to fire. The practical effect of this is that reflected lights from on or near the road are prevented to a great extent from operating the control to lower the headlight beams.

The purpose of the resistor 60 is to prevent sudden discharge of the condenser 65 through the thyratron tube V whenever the latter fires. Such sudden discharge could exceed the capacity of the thyratron tube and damage it. It could also lower the charge on the condenser 65 to such a point that the discharge in the thyratron tube V would not have time to transfer from the starter anode to the plate before the voltage on the condenser 65 dropped so low that the tube could no longer fire. If the discharge cannot transfer from the starter anode to the plate, no plate current would flow and the relay would not operate.

The line 66 is shielded as indicated at 71, and the shield is grounded as shown at 72.

The relay R includes a switch represented at 73. This switch is connected by a line 74 to the line 21. The switch is a double throw, and in one position is adapted to be connected to a contact 75 on a line 76 which goes to the high beam light relay on the car, and in its other position engages a contact 77 on a line 78 which goes to the low beam light relay on the car.

The phototube P is an electron-multiplier phototube. It includes an illuminated cathode 79 which is connected by a line 80 to the line 35, and which line includes a resistor 81. This resistor 81 is a voltage compensation resistor. The phototube P also includes a plurality of reflecting electrodes or dynodes 82, 83, 84, 85, 86, 87, 88, 89 and 90. The anode 91 of the phototube P is connected to the shielded line 66. Extending from the line 80 to a grounded connection indicated at 92 is a line 93. Connected to this line 93 is a line 94 that goes to the dynode 82. Also connected to the line 93 is another line 95 which goes to the dynode 83. Likewise another line 96 extends from the line 93 to the dynode 84. Still another line 97 extends from the line 93 to the dynode 85. Another line 98 connects the line 93 to the dynode 86. Another line 99 connects the line 93 to the dynode 87. Another line 100 connects the dynode 88 to the line 93. Another line 101 connects the dynode 89 to the line 93, and a line 102 connects the dynode 90 to the line 93.

Included in the line 93 are a plurality of neon lamps. These neon lamps are ¼ watt lamps without any resistors in the bases. A pair of the neon lamps are included in the line 93 between the connections of the lines 80 and 94 thereto. These are designated 103. A second pair of neon lamps 104 are included in the line 93 between the connections of the lines 94 and 95 thereto. A third pair of neon lamps 105 are included in the line 93 between the connections of the lines 95 and 96 thereto. A neon lamp 106 is included in the connections between the lines 96 and 97. Another neon lamp 108 is included in the connections between the lines 97 and 98. Still another neon lamp 109 is included in line 93 between the connections of the lines 98 and 99. Another neon lamp 110 is included between the lines 99 and 100. Still another neon lamp 111 is included between the lines 100 and 101, and another neon lamp 112 between the lines 101 and 102. Two more neon lamps 113 and 114 are included in the line 93 between the connection of the line 102 thereto and the grounded connection 92.

A condenser 115 of 100 μμf. is connected in parallel across the pair of lamps 105 between the lines 95 and 96. Another condenser 116 of 200 μμf. capacitance is connected in parallel across the lamp 106 between the lines 97 and 98. Still another condenser 117 is connected in parallel across the lamp 109 between the lines 98 and 99. This condenser 117 has a capacitance of 300 μμf. Another condenser 118 is connected in parallel across the lamp 110 between the lines 99 and 100 and has a capacitance of 400 μμf. Another condenser 119 is connected in parallel across the lamp 111 between the lines 100 and 101 and has a capacitance of 600 μμf. Another condenser 120 is connected in parallel across the lamp 112 between the lines 101 and 102 and has a capacitance of 1000 μμf. Still another condenser 121 is connected in parallel across the lamp 113 and has a capacitance of 1500 μμf., while still another condenser 122 is connected in parallel across the lamp 114 and has a capacitance of 2000 μμf.

The voltage drop across each neon lamp remains very nearly constant regardless of the amount of current through that lamp. Thus, the voltage across the string of lamps remains constant regardless of normal variations in voltage of the car's battery. This makes the unit entirely automatic and there is no necessity for any variable control which the driver must change to compensate for changes in battery voltage, the change of load on the battery, or the generator charging rate. The condensers 115 through 122, inclusive, which are connected across the neon lamps, cause the lamps to light consecutively rather than all at the same time. This helps to smooth out the voltage peaks on each half of the cycle and maintains a more nearly constant output from the phototube.

Operation

While the manner in which the automatic headlight control above described operates is believed to be obvious from the description of parts given, it may be briefly outlined as follows.

When the driver of a car in which one of these controls has been installed is desirous of rendering the control effective, he closes the switch 31. Assuming that there are no oncoming cars within effective range, the plates 41 of the relay R will hold the switch plate 73 in engagement with the contact 75 and thereby complete the circuit to the high beam light relay through lines 21, 74 and 76.

The phototube P is excited by the secondary coil 32 and the various connections thereto, which include the bank of neon lamps and the condensers which are connected thereacross. The secondary 39 also produces a voltage which passes through the lines 49 and 51, resistor 52, line 54, and resistor 53 to the grounded connection 55. This voltage from the secondary 39 will not pass through the relay coil 40 because under normal conditions it cannot cross the thyratron tube V, the latter being in such condition that the electric current will not pass from the anode 46 to the cathode 56.

However, when the light from an approaching vehicle strikes the phototube P, the grid of the thyratron tube is affected to cause the tube to fire. This means, of course, that the current flows thereacross and as the current now crosses the thyratron tube, it will also pass through the relay coil 40. This affects the plates 41 to draw the switch plate 73 away from the contact 75 and into engagement with the contact 77, thus breaking the circuit to the high beam light relay and completing the circuit to the low beam light relay.

Just so long as there is sufficient light on the phototube P to maintain the grid of the thyratron tube excited, current will pass therethrough and also through the relay coil, thus holding the switch 73 in position for completing the circuit to the low beam light relay. However, after the oncoming vehicle passes the car having the control, there is no light which strikes the phototube P. The grid of the thyratron goes cold and the circuit therethrough, of course, is interrupted. This also interrupts the circuit through the relay coil 40 and thus the circuit to the low beam light relay is broken, while the circuit to the high beam light relay is restored.

While preferred specific embodiments of the invention are hereinbefore set forth, it is to be clearly understood that the invention is not to be limited to the exact mechanisms, devices, and circuits illustrated and described, because various modifications of these details may be provided in putting the invention into practice within the purview of the appended claims.

What is claimed is:

1. In an automatic headlight control, a phototube adapted to be mounted in position on a car in which said control is installed wherein it receives light from the headlights of an approaching vehicle, said phototube including an illuminated cathode, an anode, and a plurality of dynodes, a vibrator adapted to be connected to the battery of said car to convert the direct current from said battery into alternating current, a power transformer including a primary connected to said vibrator and a pair of secondaries, one of said secondaries being connected to the cathode and dynodes of said phototube, a relay connected to the other of said secondaries, a thyratron control tube connected in series with said relay and having a grid connected to the anode of said phototube, a switch included as a part of said relay and adapted to complete the circuit to either the high beam light relay or the low beam light relay in the car in which said control is installed, a grounded connection connected to said last mentioned secondary and by-passing said relay and thyratron control tube, and a resistor in said last mentioned connection.

2. In an automatic headlight control, a phototube adapted to be mounted in position on a car in which said control is installed wherein it receives light from the headlights of an approaching vehicle, said phototube including an illuminated cathode, an anode, and a plurality of dynodes, a vibrator adapted to be connected to the battery of said car to convert the direct current from said battery into alternating current, a power transformer including a primary connected to said vibrator and a pair of secondaries, one of said secondaries being connected to the cathode and dynodes of said phototube, a relay connected to the other of said secondaries, a thyratron control tube connected in series with said relay and having a grid connected to the anode of said phototube, a switch included as a part of said relay and adapted to complete the circuit to either the high beam light relay or the low beam light relay in the car in which said control is installed, a line extending from a grounded connection to said last mentioned secondary and by-passing said relay and thyratron control tube, a fixed resistor in said line, and a variable resistor in said line connected to the cathode of said thyratron control tube.

3. In an automatic headlight control, a vibrator, a power transformer including a primary connected to said vibrator and a pair of secondaries, one of said secondaries being a high voltage secondary and the other a low voltage secondary, a phototube including an illuminated cathode, a plurality of dynodes, and an anode, a connection between said high voltage secondary and said cathode, a grounded line connected to said connections and including a series of neon lamps, connections between said grounded line and said dynodes, condensers of different capacities connected across certain of said neon lamps, a relay connected to said low voltage secondary, a thyratron control tube connected in series with said relay and having a grid, and a connection between said grid and the anode of said phototube.

4. In an automatic headlight control, a vibrator, a power transformer including a primary connected to said vibrator and a pair of secondaries, one of said secondaries being a high voltage secondary and the other a low voltage secondary, a grounded line connected to said primary including a variable resistor and a manually operable control switch, a phototube including an illuminated cathode, a plurality of dynodes, and an anode, a connection between said high voltage secondary and said cathode, a grounded line connected to said connections and including a series of neon lamps, connections between said grounded line and said dynodes, condensers of different capacities connected across certain of said neon lamps, a relay connected to said low voltage secondary, a thyratron control tube connected in series with said relay and having a grid, a connection between said grid and the anode of said phototube, a low pass filter in said connection, a grounded line connected to said low voltage secondary and by-passing said relay and thyratron control tube, said last mentioned grounded line including a variable resistor connected to the cathode of said thyratron control tube.

ELBERT MATTHEW PARDUE.
RALPH ORON HIGGINS.

REFERENCES CITED

The following references are of record in the file of this patent:

UNITED STATES PATENTS

| Number | Name | Date |
|---|---|---|
| 1,999,527 | Ronning | Apr. 30, 1935 |
| 2,182,987 | Hopkins | Dec. 12, 1939 |
| 2,375,677 | Moore | May 8, 1945 |
| 2,380,486 | Willis | July 31, 1945 |
| 2,407,564 | Martin | Sept. 10, 1946 |
| 2,446,718 | Ray | Aug. 10, 1948 |
| 2,476,389 | Schmidt | July 19, 1949 |
| 2,558,969 | Le Croy | July 3, 1951 |
| 2,560,748 | Silvia | July 17, 1951 |